W. R. COCKBURN.
MILKING MACHINERY.
APPLICATION FILED MAR. 4, 1915.
1,155,131.
Patented Sept. 28, 1915.
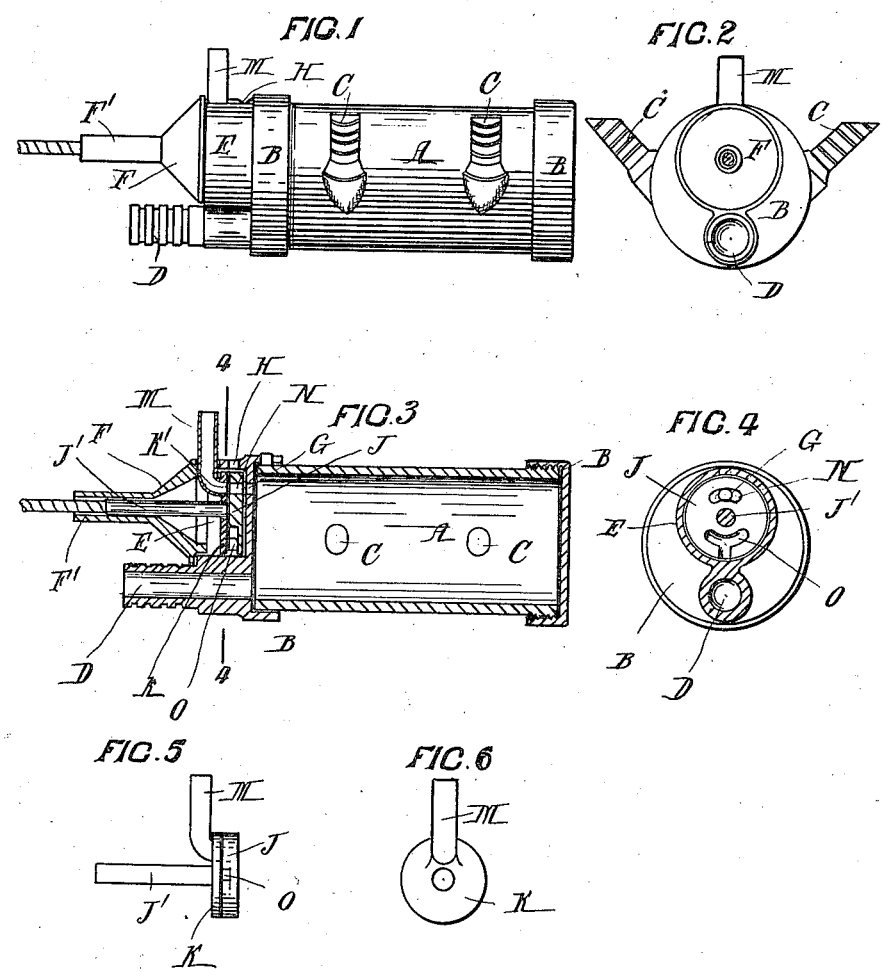
WITNESSES
INVENTOR
W. R. COCKBURN
BY H. van Oldenusel
ATTORNEY

UNITED STATES PATENT OFFICE.

WILLIAM R. COCKBURN, OF HAMILTON, NEW ZEALAND.

MILKING MACHINERY.

1,155,131.  Specification of Letters Patent. Patented Sept. 28, 1915.

Application filed March 4, 1915. Serial No. 12,103.

*To all whom it may concern:*

Be it known that I, WILLIAM REGINALD COCKBURN, subject of the King of Great Britain, residing at Hamilton, New Zealand, have invented new and useful Improvements in Milking Machinery; and I do hereby declare the following to be a full, clear, and exact description of the same.

This invention has been designed in order to provide an improved construction of combined claw and pulsator for use in milking machinery and by which construction provision is made for the usual pulsations of the outer chambers of double chambered teat cups being effected through connection of such chambers with the air, alternately with the milking vacuum source, and for the subsequent exhaustion of the air admitted into such chambers, into the milking pipe in order to assist the flow of milk along it. The construction devised also provides a milk chamber for the claw so designed as to provide an air space above the lodgment or collection of the milk therein, so that the air admitted into the chamber by the pulsations of the teat cup, will not agitate or cause any frothing or surging of the milk in the main flow pipe, or in the teat cup branches leading from the milk chamber. By the use of the invention therefore the employment of the usual line of pulsation pipes throughout the milking shed is dispensed with and only the usual milk-vacuum pipe employed. In addition the method involved in the invention by which the milk-vacuum pipe is also used for the pulsations of the teat cups and by which the pulsating apparatus is situated close up to the teats, will lead to a minimum amount of air being introduced into the vacuum system on each pulsation, with the consequent expenditure of less power in maintaining the milking vacuum at the desired degree.

The invention consists in a claw composed of a single chamber, which may be of any desired cross sectional shape such as semi-circular, circular or triangular, from the sides of which lead the four branches for connection with the milk ways of the four teat cups of the set, in the well known manner. The chamber is made of such an area as to leave a clear space along its top when the milk is flowing in from its branches at their full capacity and is connected at one end with the main milk-vacuum pipe. The teat cup branches are led from the sides of the chamber at points such as to leave this space clear of the inflowing milk.

Mounted upon the chamber are pulsating means consisting generally of a rotating disk having ports therein so arranged that in the disk's rotation the inside of the chamber will be brought into communication with a short pipe from which branches lead to the outer chambers of the respective teat cups, alternately with the opening of such pipe to the atmosphere in order thereby to obtain the desired pulsations of the teat cups. This disk is driven by flexible shafting from any suitable power source.

In order that the invention may be fully understood reference will be made to the accompanying sheet of drawings in which an approved construction of apparatus embodying the invention is shown.

In the drawings, Figure 1 is a side elevation of the complete apparatus. Fig. 2 is an end elevation thereof. Fig. 3 is a longitudinal section, and Fig. 4 a cross section on the line 4—4 of Fig. 3. Figs. 5 and 6 are detail views that will be hereinafter more fully referred to.

A is the milk or main chamber of the claw which is made of the required length and of any desired cross-sectional shape, such as the circular shape shown in the drawings. The two ends of the chamber are made hermetically tight by covers B secured respectively thereon in any suitable manner. From the sides of the chamber lead the four teat cup branches C, arranged two on each side and entering the chamber at points about or beneath the level of the center line thereof. Each of these branches is adapted to receive the end of the usual rubber tube connection generally employed to connect the milk tube of the teat cup with the claw, and which have not been shown in the drawings as their nature is well known.

In the cover B at one end of the chamber is formed the connection D adapted to receive the end of the usual rubber pipe connection with the main vacuum milk flow pipe and through which the milk is drawn away from the claw in the well known manner. The pulsating apparatus is also constructed and arranged on this cover. Upon the cover is formed the small circular chamber E which is itself covered by means of a cone shaped cap F. An aperture G is made in the base of the cover B and passing into the claw milk chamber A near the level of the top thereof, and an air inlet aperture H (Fig. 3) is made in the wall of the chamber E at the top thereof. A disk J is fitted into this chamber E so as to rotate against the base of the cover C and is fastened to a spindle J' extending outward and journaled in a sleeve bearing F' in the cap F. Fitted against the outside of the disk J is a stationary disk K having a pipe branch M leading from an aperture K' formed coincidently with the aperture G in the cover base, upward through an opening in the wall of the chamber E. This pipe branch is connected by the usual flexible pipes with the outer chambers of all four of the teat cups composing the milking set. The disk J is formed with a port N extending right through it and situated in such a position as to be adapted to coincide with the apertures G and K' as shown in Fig. 3 and thereby to connect the pipe branch M with the claw chamber A and thus to allow of the exhaustion of the outer chambers of the teat cups through such claw chamber. This disk is also formed with a second port O arranged diametrically opposite the port N and so formed as shown in Figs. 3 and 4 that when opposite the air inlet aperture H a passage will be formed between it and the aperture K' and consequently permit of the air entering the pipe M and breaking down the vacuum in the outer chambers of the teat cups. The relative arrangements and constructions of these disks J and K are shown in the detail views Figs. 5 and 6. It will thus be seen that the rotation of the disk J will cause the branch pipe M to be alternately connected with the vacuum maintained in the chamber A, and with the air, in order to obtain the desired pulsations of the teat cups. It will also be seen that the air admitted into the teat cups in such pulsations will be exhausted into the milk chamber A, entering the top thereof and passing out through the milk outflow D so as to assist the flow of the milk along the milk main. The provision of the large space in the upper part of the claw chamber and above the inlets from the milk tubes of the teat cups will insure that the fluctuations in air conditions caused by the pulsations will not affect the milking operations nor interfere with the flow of milk in such a way as to agitate or cause it to surge backward.

The disk J is driven at the desired rate of speed by any suitable flexible driving shaft, for instance a Bowden wire, fastened to its spindle J' and connected to any convenient source of power.

What I do claim as my invention, and desire to secure by Letters Patent is:—

1. A teat cup claw for milking machines consisting of a single tubular chamber having means at one end for connection with the milk-vacuum main and having teat cup branches leading from its sides, such chamber being made of such a cross sectional size and the teat cup branches so disposed as to leave a free air space above the milk therein, substantially as herein specified.

2. A teat cup claw for milking machines consisting of a single tubular chamber having means at one end for connection with the milk-vacuum main and having teat cup branches leading from its sides, such chamber being made of such a cross sectional size and the teat cup branches so disposed as to leave a free air space above the milk therein, in combination with pulsating means mounted on the chamber and adapted in their operation to connect a pipe branch alternately with the chamber and with the air substantially as specified.

3. In milking machinery, a teat cup claw consisting of a single chamber having means at one end for connection with the milk-vacuum main and having teat cup branches leading from its sides at levels below the top thereof, a cover on the chamber having a circular chamber formed thereon, a port aperture in the cover base, opening into the upper portion of the chamber, an air admission port in the wall of the circular chamber, a fixed disk mounted adjacent to the cover base within such circular chamber, a port aperture in such fixed disk arranged in a line coincident with the port aperture in the cover and communicating with a pipe branch, a rotating disk mounted between the cover and the fixed disk formed with a port extending right through it adapted to connect the port in the fixed disk with that in the cover base and with a second port arranged diametrically opposite the other and shaped to connect the port in the fixed disk with the air admission port, and means whereby such rotating disk may be rotated, substantially as specified.

In testimony whereof, I have signed this specification in the presence of two subscribing witnesses.

WM. R. COCKBURN.

Witnesses:
  JAS. B. COOK,
  H. N. ARMSTRONG.